United States Patent [19]

Tal

[11] 4,157,489

[45] Jun. 5, 1979

[54] SERVO CONTROL SYSTEM

[75] Inventor: Jacob Tal, Salt Lake City, Utah

[73] Assignee: Burroughs Corporation, Detroit, Mich.

[21] Appl. No.: 804,553

[22] Filed: Jun. 8, 1977

[51] Int. Cl.² .............................................. G05B 1/01
[52] U.S. Cl. .................................... 318/606; 318/607; 318/608
[58] Field of Search ................ 318/313, 606, 607, 608

[56] References Cited

U.S. PATENT DOCUMENTS

| | | | |
|---|---|---|---|
| 3,011,110 | 11/1961 | Yu-Chi Ho et al. | 318/608 X |
| 3,379,944 | 4/1968 | Nuttall et al. | 318/606 |
| 3,426,262 | 2/1969 | Colter | 318/313 |
| 3,462,663 | 8/1969 | Schiller | 318/606 |

Primary Examiner—B. Dobeck
Attorney, Agent, or Firm—Charles P. Sammut; David R. Syrowik; Carl Fissell, Jr.

[57] ABSTRACT

An apparatus forming an incremental motion system is described for controllably moving a load from a first position to a second position in a forward mode to track a moving object field in response to an external reference signal. The apparatus moves the load from the second position back to the first position in a reverse mode. A motor having a rotatable shaft supplies the moving force to the lens shuttle. An optical tachometer having a rotating apertured element fixedly secured to the shaft to rotate therewith generates a signal, upon serving each aperture, in each of the forward and return modes. The signals corresponding to served apertures define feedback signals having corresponding frequencies. A forward control circuit is responsive to the frequency of the reference signal and the frequency of the feedback signal in the forward mode to provide a forward control signal to an amplifier which energizes or drives the motor. A return home circuit, responsive to the net number of signals or pulses indicating the angular displacement of the shaft from the first position, is also responsive to the frequency of the feedback signals in the return mode to provide a return control signal to the amplifier. A home lock circuit locks the lens shuttle in the first position upon its return from the second position.

19 Claims, 9 Drawing Figures

COMPENSATION CIRCUIT

SYSTEM IN RETURN HOME MODE

SERVO CONTROL SYSTEM

BACKGROUND OF THE INVENTION

This invention relates in general to servo control systems and, in particular, to incremental motion systems.

In document processing systems it has become desirable to film moving documents in order to more permanently store the information contained therein. In order to make such filming economical, these documents, which can be as much as 9.25 inches long, flow through the system at a rate of up to 600 documents per minute. Therefore, it is a system requirement that the documents be filmed while the documents are moving at approximately 100 inches per second. Patent application Ser. No. 723,361, filed Sept. 15, 1976 and entitled "Document Photography System", now U.S. Pat. No. 4,087,173, and claims a document photography system which can maintain this through-put level while a particular document is recorded on the film with a 50:1 reduction. To achieve the required resolution on the film the lens shuttle of the subject document photography system must move during the filming process at a velocity that is proportional to the velocity of the document and thereafter return to its initial position to film a second moving document. Furthermore, the velocity should be maintained to a high degree of accuracy to minimize the resolution problems on the film. A phase-locked servo system having different modes of operation was therefore required to provide the unique combination of incremental motion drive and high precision velocity control. In particular, the phase-locked servo system was required to respond within typically 10 milliseconds of a reference signal indicating the movement of a document through the system.

A first apparatus is described and claimed for controllably moving a load from a first position to a second position in a forward mode to track a moving object field in response to an external reference signal. An apparatus constructed in accordance with the invention comprises a driving means responsive to the reference signal for moving the load out of the first position towards the second position. The driving means includes a motor for supplying the moving force. The load has a predetermined displacement in the second position. The apparatus also includes sensing means for sensing the displacement of the load by generating a plurality of pulses at predetermined intervals along the displacement. The pulses generated in the forward mode define a feedback signal having a corresponding frequency. Also included is a forward control circuit means responsive to the reference signal and the feedback signal in the forward mode to provide a forward control signal. The forward control circuit means includes a rate comparator means which is responsive to the reference signal and the sensing means to provide the driving means with a velocity signal which corresponds to the discrepency between the reference signal and the resulting feedback signal.

A second apparatus is described and claimed for controllably moving the load back to the first position from the second position in a return mode. A second apparatus constructed in accordance with the invention includes the driving means of the first apparatus for moving the load out of the second position towards the first position. Also included is the sensing means of the first apparatus which generates a plurality of signals or pulses at the same predetermined intervals as the load moves from the second position to the first position in the return mode. A control means which is responsive to the difference in the number of pulses in the forward mode and the return mode and which is responsive to the return angular velocity provides a return control signal. The driving meams is responsive to the return control signal to accelerate and decelerate the load in alternating fashion.

Other advantages of the present invention will be readily appreciated as the same becomes better understood by reference to the following detailed description when considered in connection with the accompanying drawings wherein.

Figure 1:
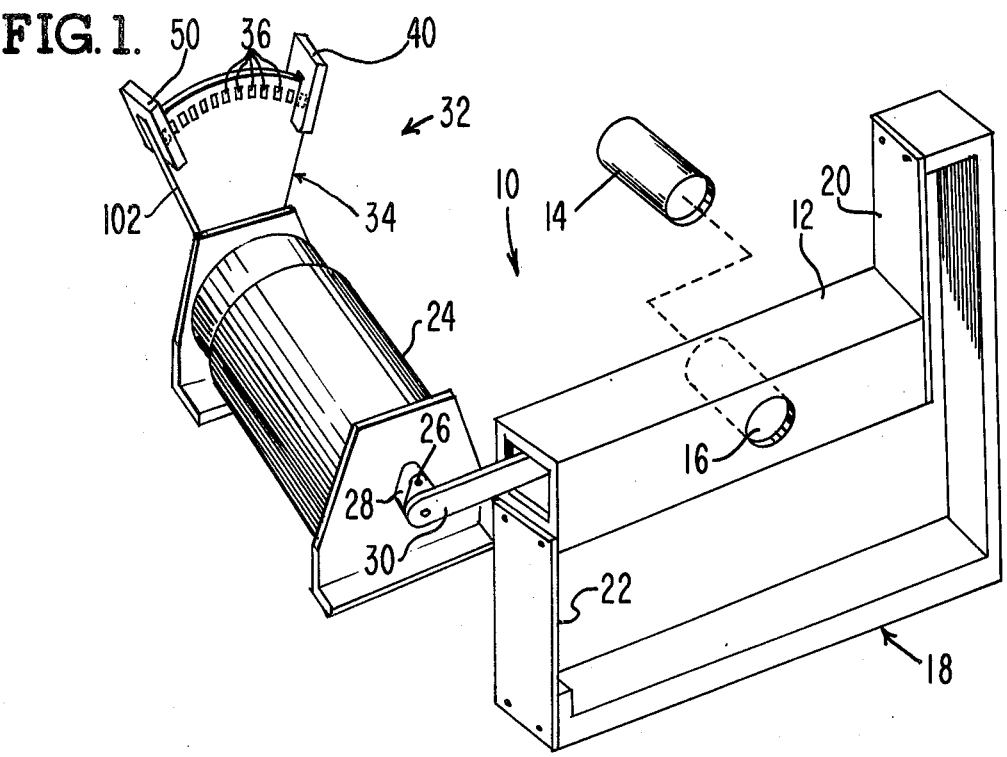
FIG. 1 is a perspective view showing the subject servo control system as it is used as part of a document processing system that provides data acquisition, transmission and document encoding for proof encoding applications.

FIG. 1 shows a portion of the document processing system described and claimed in the U.S. patent application Ser. No. 723,361 filed Sept. 15, 1976, now U.S. Pat. No. 4,087,173 "Document Photography System," which application is hereby incorporated by reference. The prior system has been modified as will be described in greater detail hereinafter.

As previously described in the above noted application, the lens shuttle generally indicated at 10 comprises a lens housing 12 and a lens system 14, disposed in an aperture 16 extending therethrough the lens housing 12. The lens shuttle 10 is supported on a lens mounting generally indicated at 18 by a pair of vertical support members 20 and 22 which act as leaf springs to position the lens shuttle 10 in a neutral position as shown in FIG. 1 wherein the support members 20 and 22 are not exerting any horizontal force on the lens shuttle 10. It is easily seen that the vertical support members 20 and 22 oppose any horizontal motion of the lens shuttle 10 along the longitudinal axis of the lens shuttle 10.

As previously described, the lens shuttle 10 including the lens system 14 must be moved along the longitudinal axis of the lens shuttle 10 in order to deposit images from moving documents upon film in a wiping fashion which is thereby exposed to these images.

Because the system must have the capability of processing up to 600 documents per minute, which documents vary from 4.875 inches to 9.25 inches in length, and at the same time achieve a reduction of image of 50:1, the lens shuttle 10 must move at a velocity proportional to the velocity of the documents with a high degree of accuracy. Furthermore, the lens shuttle 10 must begin to move forward to track the moving document to be filmed and synchronized with the moving document within typically 10 milliseconds due to the high speed of the documents to be processed. A driving means or a DC servo motor 24 is provided to controllably move the lens shuttle 10 in a forward mode to film the moving images from the documents and in a reverse or return mode to move the lens shuttle 10 back towards the neutral or first position and in a locking mode to stably position the lens shuttle 10 to thereafter await the passage of a second document to be filmed.

As previously described, the motor 24 having a rotatable shaft, not shown, has attached thereto about the shaft axis 26 a crank 28, which crank 28 drives the lens shuttle 10 through a link 30.

As previously described in the prior application, the ratio of the motor angular velocity to the shuttle linear velocity, varies as the sinusoidal function of the motor angular position $\theta$. In the embodiment of the present invention angular position $\theta$ of the motor 24 and therefore of the shaft of the motor 24 varies over approximately 58 degrees for a 9 inch document. In other words, in tracking a 9 inch document, the shaft of the motor 24 will rotate from a first position to approximately 58 degrees and thereafter back to the first position to prepare to track a second document.

The present invention relates to an apparatus including the motor 24 for moving a load including the lens shuttle 10 from its first or neutral position as shown in FIG. 1 to a second position at which point the document is no longer tracked or filmed. A reference signal is generated from a timing disk attached to the document drive roll, not shown, which drives the document. The apparatus of the subject invention is responsive to the reference signal, which is representative of the velocity of the documents, or controllably moves the lens shuttle 10 as it tracks the moving document.

A sensing means or an optical tach generally indicated at 32 senses the angular displacement of the rotatable shaft of the motor 24 by generating a plurality of signals or pulses at predetermined intervals along the angular displacement of the shaft. The optical tach 32 includes a pie-slice or fan-shaped rotating element generally indicated at 34 fixedly secured to the rotating shaft so as to rotate therewith. The rotating element 34 has an array of light apertures 36 spaced apart and extended therethrough the rotating element 34 in a predetermined non-linear or non-uniform pattern as previously described in the above cited patent application. Position sensors 38 shown in block form in FIG. 2 sense the relative angular position of the motor shaft. Position sensors 38 include a position feedback sensor 40 for generating the position feedback clock or signal from pulses upon sensing an aperture in the rotating element or timing disk 34 as previously described. It is to be understood that the feedback pulses emitted by the position feedback sensor occurs in both the forward and return modes, one feedback signal for each sensed aperture 36.

Figure 2:
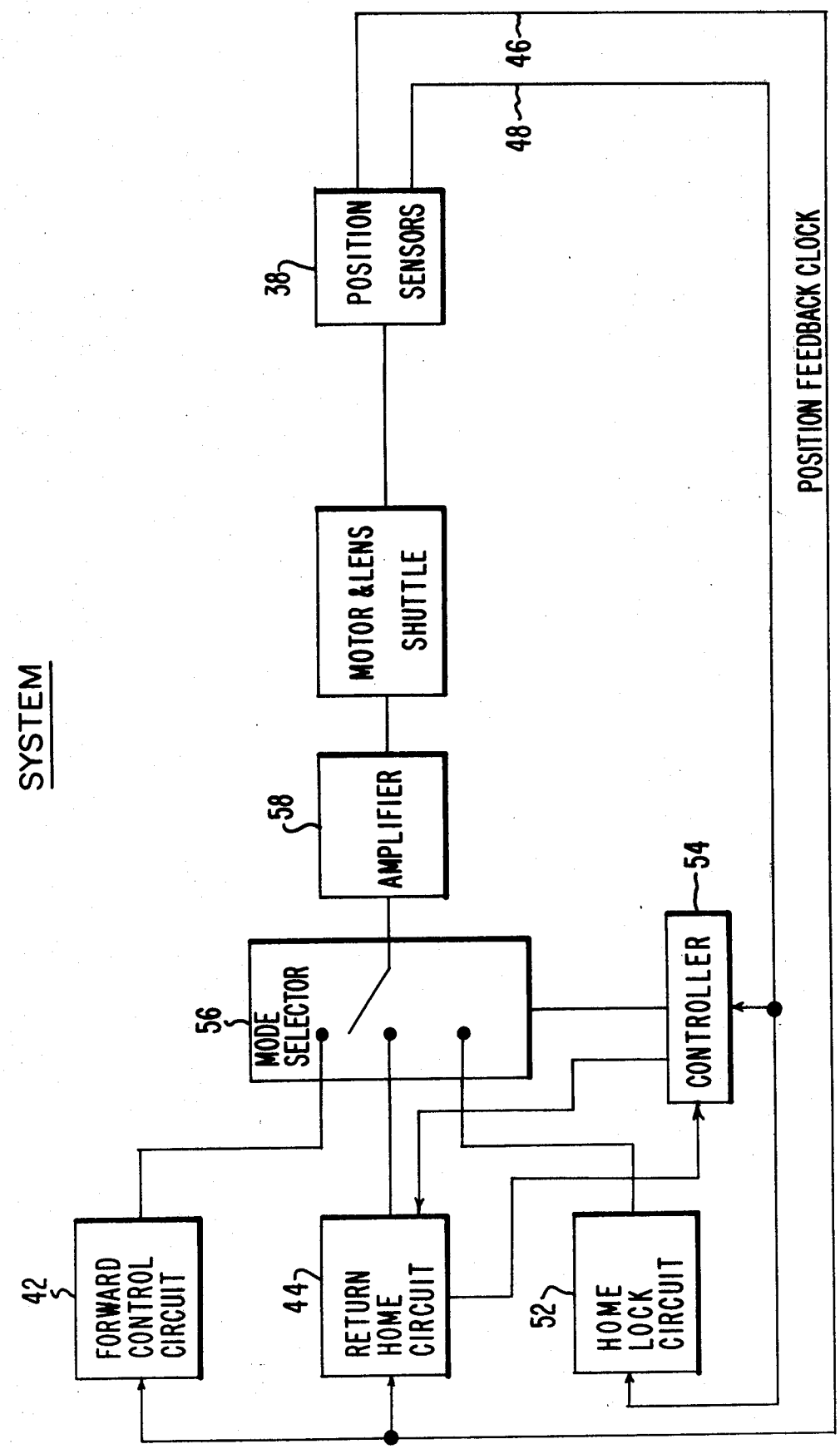
FIG. 2 shows in block diagram form the subject servo system.

As shown in FIG. 2, which shows the entire servo control system, the position feedback signal is fed to a forward control circuit 42 as well as to a return home circuit 44 along a feedback path 46. A second feedback path 48 is provided between a locking position sensor 50 of the position sensors 38 and a home lock circuit 52 and a controller 54 of the system which will be described in greater detail hereinafter. It is sufficient to say at this point that the controller 54 and a mode selector 56 define a switching means responsive to the locking position sensor and to the passage of a moving object field to electrically connect one of the forward control circuit 42, the return home circuit 44 and the home lock circuit 52 to the DC servo motor 24 by way of an amplifier 58, which together with the DC servo motor 24 define the driving means.

Figure 3:
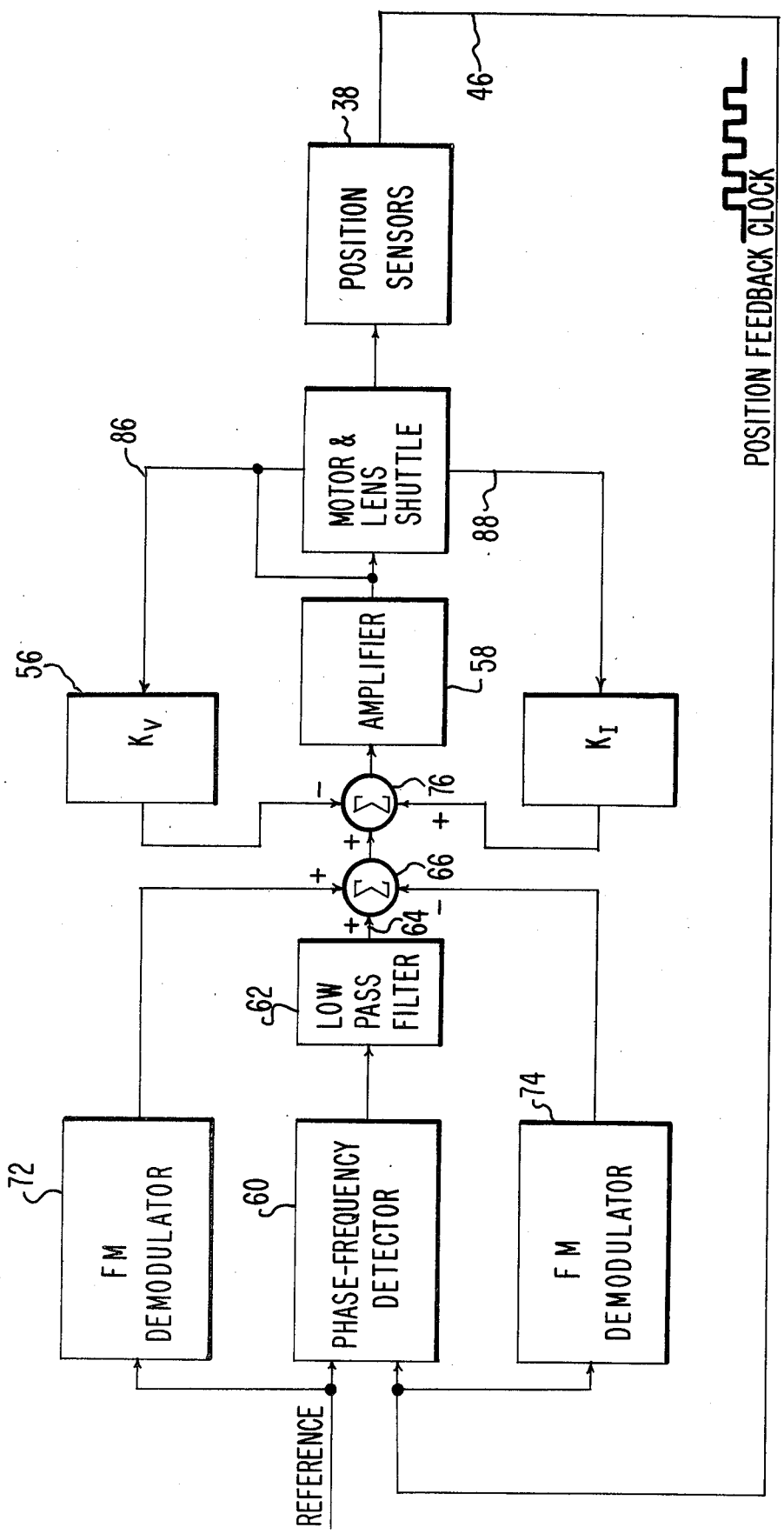
FIG. 3 shows in block diagram from the system in its forward mode.

The forward control circuit 42 is shown in greater detail in FIG. 3 wherein the system is shown in its forward mode. The forward control circuit 42 includes a phase comparator means or a phase frequency detector 60 which is responsive to the phase difference between the reference signal and the feedback signal or position feedback clock. The phase-frequency detector 60 is also responsive to the frequency differences of the reference and feedback signals. However, the response of the phase-frequency detector 60 is not sufficient to generate, by itself, a fast response to a change in the reference signal.

The phase-frequency detector 60, its associated low pass filter 62, the amplifier 58, the motor 24 and the sensor 40, define a position control loop or phase-locked loop to provide fine control so that the motor 24 which is an Electrocraft E54D motor, can follow the reference signal with a high degree of accuracy to track the moving document. The phase frequency detector 60 provides a position command signal to the first input 64 of a summing junction generally indicated at 66. The position command signal has a magnitude proportional to the phase difference and the frequency difference between the reference signal and the position feedback clock.

Figure 4:
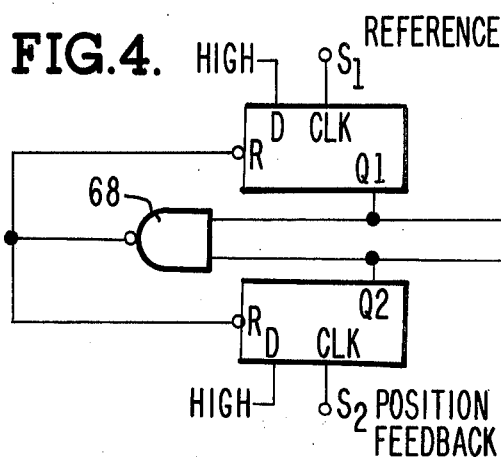
FIG. 4 shows the circuit elements comprising the phase frequency detector of FIG. 3.

The phase frequency detector 60 and the low pass filter 62 are shown in greater detail in FIG. 4. The phase frequency detector 60 comprises a pair of D flip flops with the D inputs held high as they are clocked by the reference signal and the position feedback clock and reset by a common NAND gate 68 which has as its inputs the Q1 and Q2 outputs of the dual flip flops. Both the Q1 and Q2 outputs of the flip flops are filtered through resistive-capacitive low pass filters to be fed into the negative and positive inputs of an operational amplifier 70 respectively. A feedback resistor R8 is provided between the output of the operational amp 70 and the negative input of the operational amp 70 to determine the gain of the operational amp 70. The output of the operational amp 70 is a DC signal proportional to the phase difference between the reference signal and the position feedback clock. In the preferred embodiment of the present invention, resistors R1, R2, R3 and R4 each have a value of 100 kilohms; resistors R5 and R6 have a value of 1 kilohm; each capacitor C1 and C2 have a value of 100 microfarrads, while resistors R7 and R8 each have a value of 560 kilohms.

The forward control circuit 42 also includes a pair of FM demodulators 72 and 74 which, along with the summing junction 66, define a rate comparator means to provide the motor 24 with a velocity feedback or command signal having a magnitude corresponding to the difference between the frequencies of the reference signal and the position feedback signal. The first FM demodulator 72 or first detector means is responsive to the frequency of the reference signal to provide a corresponding DC reference signal which varies in magnitude as the frequency varies at the summing junction 66. The second FM demodulator 74 or second detector means is responsive to the frequency of the position feedback signal to provide a corresponding DC feedback signal to the summing junction 66, which DC feedback signal is subtracted at the summing junction from the DC reference signal to provide a velocity command signal at a second summing junction generally indicated at 76.

Both of the FM demodulators 72 and 74 comprise phase-locked loops to improve velocity acquisition and also to improve constant velocity control. Both FM demodulators 72 and 74 provide the effect of an analog velocity feedback to thereby achieve a greater or a wider bandwidth of the system to get a faster response time in tracking the moving documents and in this case to achieve the velocity of the moving documents within 10 milliseconds. Another reason for using the FM demodulators 72 and 74 and their equivalent velocity feedback is that their use improves the stability of the loop considerably. In the present system the velocity feedback in the form of a velocity signal is initially dominant. However, as the motor 24 gets up to the desired speed, the velocity command signal decreases and the position feedback in the form of the position signal becomes more important in controlling the motor 24.

Figure 5:
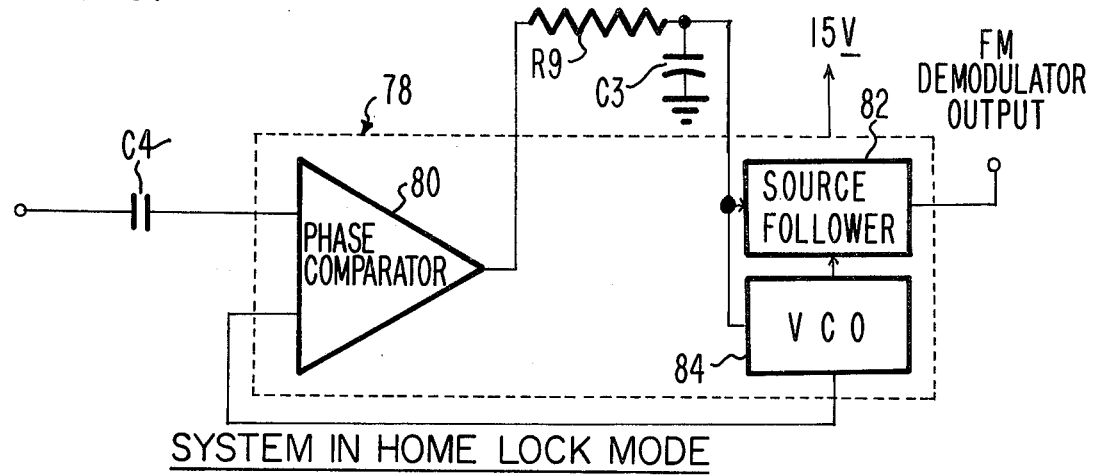
FIG. 5 shows the specific circuit elements comprising the FM demodulators of the forward control circuit and the return home circuit.

Each of the FM demodulators 72 and 74 are shown in greater detail in FIG. 5. The particular FM demodulator used in the preferred embodiment of the instant invention uses a COS-MOS phase-locked loop manufactured by the Radio Corporation of America. The FM demodulator includes a CD4046A integrated circuit generally indicated at 78. The FM demodulators 72 and 74 also include a low pass filter including resistor R9 and a capacitor C3 having values of 100 kilohms and 0.1 microfarads respectively. The values of R9 and C3, of course, depend on the operating frequency of the system. A coupling capacitor C4 is also provided to couple the FM demodulators 72 and 74 to their respective inputs.

The integrated circuit 78 of the FM demodulators 72 and 74 includes a phase comparator 80, a source follower transistor 82 and a voltage controlled oscillator or VCO 84. The phase comparator 80 produces a pulsing output which is converted into a DC voltage level by the R9-C3 resistive-capacitive low pass filter, which voltage level is then fed into the VCO 84. The VCO 84 produces an output square-wave signal whose frequency is proportional to the input voltage. The output of the VCO 84 is then fed into the phase comparator 80 to complete the phase-locked loop. As a result, the FM demodulator produces a DC level signal whose amplitude is proportional to the input signal frequency inputted to the phase comparator 80.

As shown in FIG. 5, the integrated circuit chip is operated at a 14 volt supply voltage instead of the usual 5 volts, to improve the accuracy of the device. Of course, if even greater accuracy is desired, the integrated circuit chip could be replaced by individual discrete components.

One obvious advantage of using an FM demodulator to improve the phase-lock acquisition time of the position control loop is to avoid the necessity of using DC or magnetic tachometers to provide the velocity feedback. Such DC or magnetic tachometers are expensive and also are cumbersome and cannot be placed easily into a compact circuit like the one of the present invention.

As previously described, the DC reference signal generated by the first FM demodulator 72 and the DC feedback signal generated by the second FM demodulator 74 are added and subtracted respectively with the position signal from the low pass filter 62 at the summing junction 66 or differential means to provide the velocity and position signals at the second summing junction 76 to drive the amplifier 58 and thereby the servo motor 24.

To improve the start-up time of the servo motor 24, voltage feedback is provided along a path 86 which is dependent on the back EMF of the motor 24. Also current feedback is provided which is proportional to the motor current along a second path 88. Both the feedback paths 86 and 88 are algebraically subtracted in the second summing junction 76 and additively combined with the velocity and position signals generated by the first summing junction 66 to control the motor. It should also be noted at this time that the amplifier 58 comprises an operational amplifier, a current amplifier and a power amplifier effectively connected to the motor 24 to provide the necessary amplification to the signal from the second summing junction 76 as is well known in the art.

Figure 6:
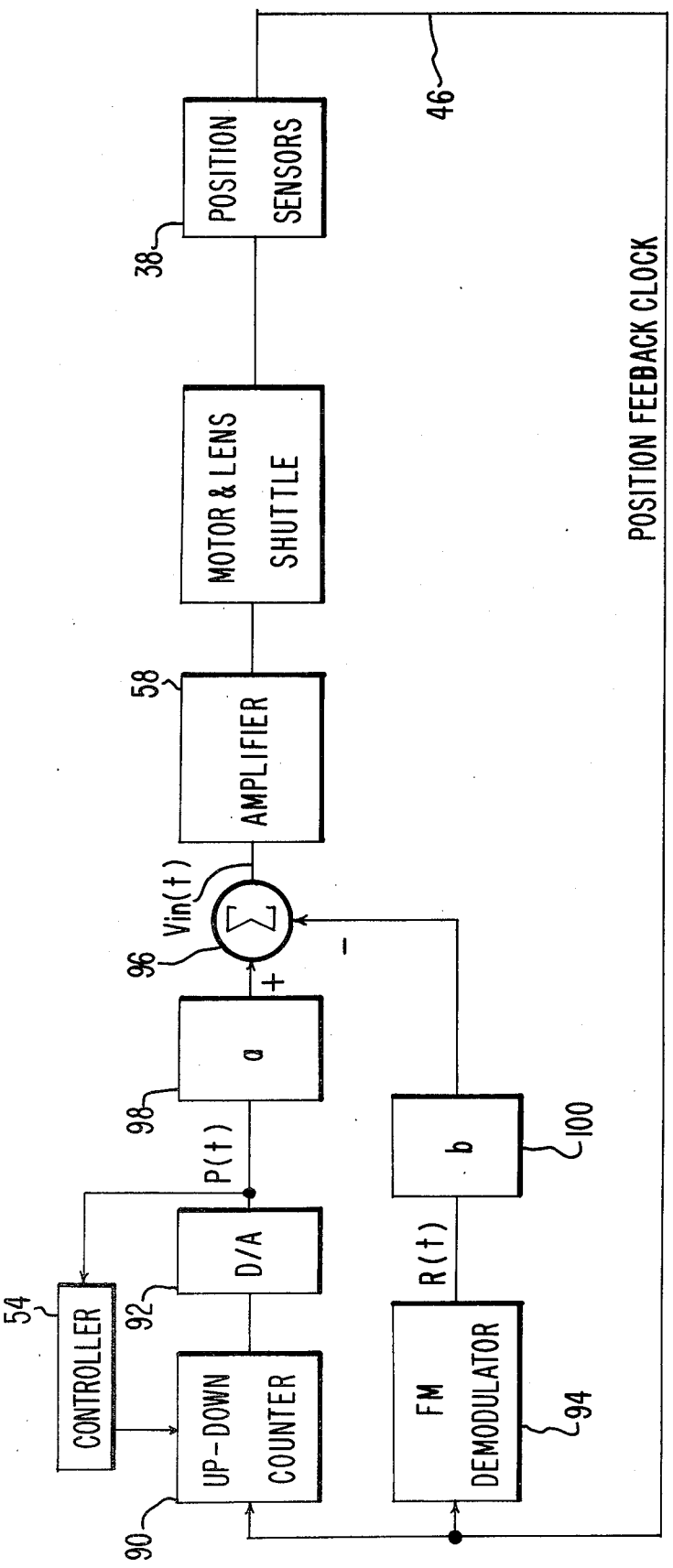
FIG. 6 is a block diagram of a system in return home mode.

FIG. 6 shows the system in return home mode and, more particularly, shows the return home circuit 44. In general, the system in return home mode controllably moves the lens shuttle 10 back to the first or neutral position after being moved to the second position. As previously noted, the shaft of the motor 24 has a predetermined angular displacement resulting from tracking a moving document of a particular length. The position sensors 38 through its clock or feedback position sensor 40, senses the angular displacement of the shaft by generating a pulse upon encountering each of the light apertures 36 as the shaft is angularly displaced. The pulses generated by the feedback position sensor 40 when the system is in the forward mode, are used to count up the up/down counter 90. The controller 54, which includes a document present sensor, not shown, allows the up/down counter 90 to start counting down when the document present sensor indicates that the moving object field or the moving document has passed by the area where the images are filmed from, thereby indicating to the system that the system is to enter its return home mode in preparation of filming a second moving document. The document present sensor may typically include a photo-transistor and a photodiode disposed on the same or opposite sides of the path traveled by the moving document to sense the passage of the first moving document.

Since the controller 54 allows the position feedback clock pulses to down count the up/down counter 90 in the return mode, the up/down counter 90 effectively contains the digital information relating to the net angular displacement of the motor shaft from its neutral or first position. This digital information is fed into a digital to analog converter 92 to develop a position signal P(t) which is an analog signal indicated in the first graph of FIG. 7 wherein P(t) has a maximum valve at time t=0 which is the time that the document present sensor enables the controller 54 to switch-in the return home circuit 44 by means of the mode selector 56 and also enables the up/down counter 90 to start down-counting in response to the position feedback pulses from the position feedback sensor 40.

Figure 7:
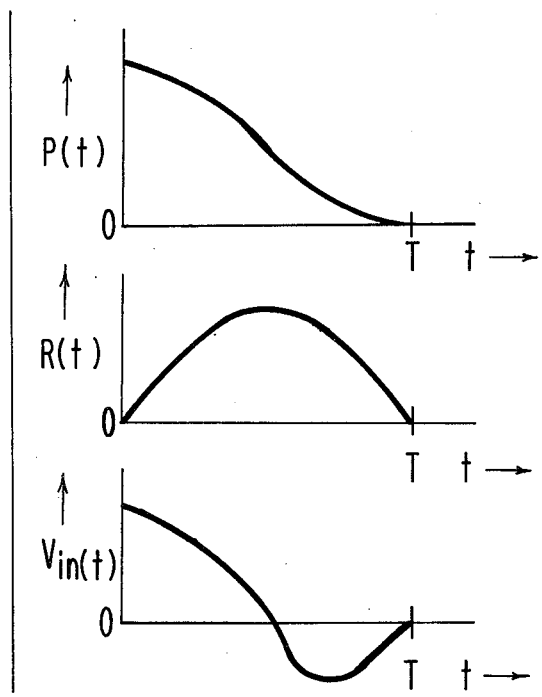
FIG. 7 is a graphical representation of the position, the rate, and the control signals developed by the system in the return home mode.

The up/down counter 90 and a rate detector means or a third FM demodulator 94 are responsive to the number of position feedback clock pulses and the return angular velocity of the motor shaft respectively to provide a return control signal $V_{in}(t)$ as shown in the bottom graph of FIG. 7. The amplifier 58 is responsive to this return control signal $V_{in}(t)$ to thereby cause the motor 24 to first accelerate the lens shuttle 10 in the reverse direction and then decelerate the lens shuttle until the signal P(t) equals 0 which indicates that the shaft is in its first or neutral position, at which time the controller 54 causes the mode selector 56 to engage the home lock circuit 52 thereby putting the system in its home lock mode.

The FM demodulator 94 is structurally the same as the FM demodulators 72 and 74 as shown in FIG. 5. In other words, the FM demodulator 94 develops a DC rate signal proportional to the frequency of the position feedback signal. This DC rate signal R(t) is shown in the second graph of FIG. 7 and shows how the velocity of the motor shaft increases until the signal developed from the DC rate signal exceeds the signal developed from the DC position signal P(t) at a third summing junction 96, at which time the signal $V_{in}(t)$ turns negative thereby causing the servo motor to decelerate its return velocity. Gain blocks 98 and 100 are provided to amplify the signals P(t) and R(t) respectively so that when the amplified signals are combined, the resulting $V_{in}(t)$ is such that it drives the motor 24 to the first position in minimum time and without overshooting. In other words, the gain blocks 98 and 100 are designed such that when the position signal P(t) becomes 0, the rate signal R(t) will become 0 also as shown in FIG. 7 at t=0. The gain blocks 90 and 100 essentially comprise operational amplifiers which can be gain adjusted by the selection of a feedback resistor to provide the necessary constants a and b. Summing junction 96 algebraically subtracts the resulting signal bR(t) from the resulting signal aP(t) to obtain the signal $V_{in}(t)$. Comparison means or the summing junction 96 comprises an operational or summing amplifier which subtracts the rate signal bR(t) from the position signal aP(t) to output the return control signal $V_{in}(t)$. The gain blocks 98 and 100 along with the FM demodulator 94, the digital-to-analog converter 92 and the summing junction 96 define a control means or the return home circuit 44.

Again, the FM demodulator 94 operates in the same fashion and is constructed the same as the FM demodulators 72 and 74 and shown in FIG. 5. In this way the FM demodulator 94 acts to provide velocity feedback information at the summing junction 96 to be combined or compared with the position feedback information aP(t) to obtain the resulting return control signal $V_{in}(t)$ to thereby control the return movement of the lens shuttle 10.

After the signal P(t) drops to 0 indicating that the lens shuttle 10 has reached the first or home position, the controller 54, as previously noted, initiates the home lock mode of the system by actuating the mode selector 56 to thereby electrically connect the home lock circuit 52 to the amplifier 58. In the home lock mode the home position sensor 50 senses an edge of a slot 102 formed therein the fan-shaped rotating element 34. The home position sensor has an output which varies linearly between plus or minus 5 volts over a distance of typically 0.009 inches and has an output of approximately 0, and not exactly 0 due to the slight force exerted by the vertical members 20 and 22, at the home locking position to which the home lock circuit 52 seeks. The output of the home position sensor 50 is inverted by a fourth summing junction 103 of the home lock circuit along the path 48.

Figure 9:
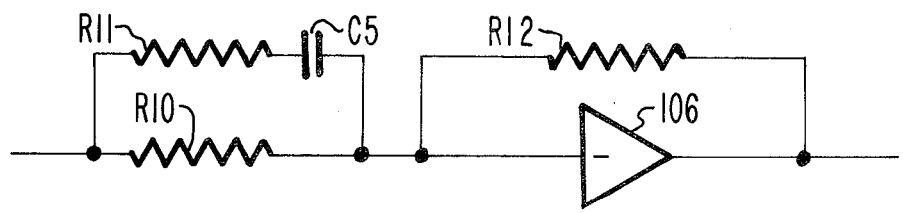
FIG. 9 shows the particular circuit elements comprising the compensation block shown in FIG. 8.

The home lock circuit 52 also includes a compensation circuit 104 shown in greater detail in FIG. 9. The compensation circuit 104 is used to stabilize the system and yet maintain the sufficiently high gain that results from the variation of the position feedback voltage by 10 volts over the small distance of 0.0009 inches. The compensation circuit or network 104 is a lead-lag network including resistors R10 and R11 and a capacitor C5. The lead-lag network also includes an isolation or operational amplifier 106 and a feedback resistor R12 connected to the negative input terminal and the output terminal of the amplifier 106. Resistor R11 and capacitor C5 are serially connected in parallel across resistor R10. The resistors R10 and R11 and the capacitor C5 connected in this fashion comprise the input impedance. The input impedance is connected to the negative input terminal of the amplifier 106. Resistor R10 has a valve of 2.2 megohm, resistor R11 has a value of 15 kilohm, resistor R12 has a value of 4.4 megohm, and capacitor C5 has a value of 0.0015 microfarad. The resulting transfer function of the compensation network is $G(s) = R12[1+(R10+R11)C5S]/[R10(1+R11C5S)]$.

For the values of the components specified above, $G(S) = 2(1+3.32 \cdot 10^{-3}S)/(1+2.25 \cdot 10^{-5}S)$. The transfer function has a gain of 2 at low frequencies and has a 0 or lead at the frequency w=300 radians per second. This network results in a stable system with sufficient gain.

Figure 8:
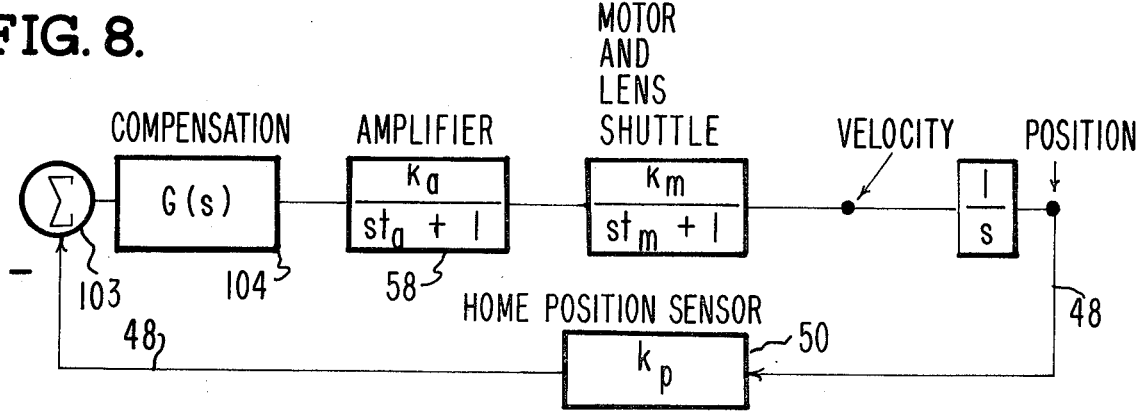
FIG. 8 is a block diagram of the system in the home lock mode.

The amplifier 58, the motor 24, the home position sensor 50 and the compensation network 104 form a position control loop around the home lock or first or neutral position. The small interval, 0.009 inches, guarantees the home position accuracy, while the compensation network or circuit 104 insures the stability of the loop. As shown in FIG. 8, the amplifier 58, the motor and lens shuttle block and the position of the motor shaft are represented by simplified transfer functions, which transfer functions are useful in analyzing the system from a systems point of view.

A second method for providing the velocity feedback required when the system is in its return home mode will now be described.

Essentially, the FM demodulator 94 is replaced by a rate counter, a latch, and a second D/A converter (all of which are not shown). The rate counter is enabled for some short period of time, i.e. 1 millisecond, to count the number of feedback pulses from the sensor 40. The contents of the rate counter are then latched into the second D/A converter which is thereafter fed into the block 100. After each 1 millisecond period, the rate counter is reset by a clock through a delay network which clock also causes the latching action. As a result, the output of the second D/A converter is proportional to the velocity because of the effective integration of the feedback clock pulses over 1 millisecond intervals.

The invention has been described in an illustrative manner and it is to be understood that the terminology which has been used is intended to be in the nature of words of description rather than of limitation.

Obviously, many modifications and variations of the present invention are possible in light of the above teachings. It is therefore to be understood that within the scope of the appended claims, the invention may be practiced otherwise than as specifically described.

The embodiments of the invention in which an exclusive property or privilege is claimed are defined as follows:

1. An apparatus for controllably moving a lens system from a first position to a second position in a forward mode to track a moving object field in response to an external reference signal, the external reference signal having a frequency proportional to the velocity of the moving object field, the apparatus further controllably moving the lens system back to said first position in a return mode, said apparatus comprising: a lens system driving means responsive to the reference signal for moving the lens system out of the first position towards the second position and back to the first position, said driving means including a motor having a rotatable shaft for supplying said moving force, said rotatable shaft rotating with a varying angular return velocity and having a predetermined angular displacement in said second position;

sensing means for sensing the angular displacement of said rotatable shaft by generating a plurality of pulses at predetermined intervals along said angular displacement and at the same predetermined intervals the load moving from the second position to the first position, said plurality of pulses generated in said forward and return mode defining feedback signals having corresponding frequencies;

forward control circuit means responsive to the frequency of each of said reference signal and said feedback signal in said forward mode for providing a forward control signal;

control means responsive to the net number of pulses indicating the angular displacement of the shaft from the first position and responsive to the frequency of said feedback signal in said return mode for providing a return control signal; and switching means responsive to the passage of the moving object field for supplying said forward control signal to said driving means during said forward mode and said return control signal to said driving means during said return mode.

2. The apparatus as defined in claim 1 including locking means responsive to said switching means for producing a locking signal to lock the load in the first position upon its return from the second position, said switching means being responsive to said net number of signals.

3. The apparatus as defined in claim 2 wherein said sensing means includes an optical tachometer operatively associated with said shaft.

4. The apparatus as defined in claim 3 wherein said locking means includes a sensor means for sensing a portion of said optical tachometer to produce said locking signal.

5. The apparatus as defined in claim 1 wherein said control means includes a rate detector means responsive to the frequency of the signals representing the angular return velocity for providing a corresponding DC rate signal.

6. The apparatus as defined in claim 5 wherein said rate detector means includes a phase-locked loop.

7. The apparatus as defined in claim 5 wherein said rate detector means includes an FM demodulator.

8. The apparatus as defined in claim 1 wherein said control means includes positioning means responsive to the net number of pulses representing said angular displacement for providing a corresponding DC position signal.

9. The apparatus as defined in claim 8 wherein said positioning means includes storage means for storing said net number of pulses, the number of said pulses incrementing upon movement in said forward mode and decrementing upon movement in said return mode.

10. The apparatus as defined in claim 9 wherein said storage means comprises an up/down counter.

11. The apparatus as defined in claim 9 wherein said positioning means includes converting means for converting the net number of pulses into said corresponding DC position signal.

12. The apparatus as defined in claim 8 wherein said control means includes a rate detector means responsive to the frequency of the signal representing the angular return velocity for providing a corresponding DC rate signal.

13. The apparatus as defined in claim 12 wherein said control means includes comparison means for comparing said rate signal with said position signal to obtain said return control signal.

14. The apparatus as defined in claim 13 wherein said rate detector means comprises a phase-locked loop.

15. The apparatus as defined in claim 13 wherein said rate detector means comprises an FM demodulator.

16. The apparatus as defined in claim 15 wherein said positioning means includes storage means for storing said net number of pulses, the number of said pulses incrementing upon movement in said forward mode and decrementing upon movement in said return mode.

17. The apparatus as defined in claim 16 wherein said storage means comprises an up/down counter.

18. The apparatus as defined in claim 17 wherein said sensing means includes an optical tachometer operatively associated with said shaft, said optical tachometer having an array of light apertures spaced apart in a predetermined non-uniform pattern.

19. The apparatus as defined in claim 18 wherein said comparison means comprises an operational amplifier.

* * * * *